(12) United States Patent
Takeda et al.

(10) Patent No.: US 7,995,478 B2
(45) Date of Patent: Aug. 9, 2011

(54) NETWORK COMMUNICATION WITH PATH MTU SIZE DISCOVERY

(75) Inventors: Yutaka Takeda, San Mateo, CA (US); James E. Marr, Burlingame, CA (US); Payton R. White, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 249 days.

(21) Appl. No.: 11/755,693

(22) Filed: May 30, 2007

(65) Prior Publication Data

US 2008/0298376 A1      Dec. 4, 2008

(51) Int. Cl.
*H04L 12/26* (2006.01)

(52) U.S. Cl. ........ 370/235; 370/351; 370/389; 370/400; 709/232; 709/238

(58) Field of Classification Search .................. None
See application file for complete search history.

(56) References Cited

U.S. PATENT DOCUMENTS

| | | |
|---|---|---|
| 4,764,928 A | 8/1988 | Akerberg |
| 4,787,051 A | 11/1988 | Olson |
| 4,843,568 A | 6/1989 | Krueger |
| 5,128,671 A | 7/1992 | Thomas, Jr. |
| 5,528,265 A | 6/1996 | Harrison |
| 5,544,325 A | 8/1996 | Denny et al. |
| 5,596,720 A | 1/1997 | Hamada et al. |
| 5,630,184 A | 5/1997 | Roper et al. |
| 5,636,216 A | 6/1997 | Fox et al. |
| 5,701,427 A | 12/1997 | Lathrop |
| 5,768,382 A | 6/1998 | Schneier et al. |
| 5,768,531 A | 6/1998 | Lin |
| 5,793,763 A | 8/1998 | Mayes et al. |
| 5,809,016 A | 9/1998 | Kreitzer et al. |
| 5,812,531 A | 9/1998 | Cheung et al. |

(Continued)

FOREIGN PATENT DOCUMENTS

EP           0 913 965           5/1999

(Continued)

OTHER PUBLICATIONS

RFC 1191,"Path MTU Discovery", J. Mogul and S. Deering, which is available on the internet at http://www.ietf.org/rfc/rfc1191.txt?number=1191, Nov. 1990.

(Continued)

*Primary Examiner* — Ayaz Sheikh
*Assistant Examiner* — Nicholas Sloms
(74) *Attorney, Agent, or Firm* — Joshua D. Isenberg; JDI Patent

(57) ABSTRACT

A method for network communication and an apparatus for discovery of a maximum transmission unit (MTU) size in a path between two nodes of a network are disclosed. A plurality of test packets of varying transmission unit (TU) size may be sent from the first host to the second host. A "do not fragment" (DF) flag for the test packets is not set. It is determined whether one or more of the test packets were received by the second host. An estimated path MTU for a network path between the first and second hosts size may then be calculated based on one or more patterns of receipt of the test packets by the second host. Once the estimated Path MTU size has been determined, message packets of a size less than or equal to the Path MTU size may be sent over the network path.

17 Claims, 5 Drawing Sheets

U.S. PATENT DOCUMENTS

| | | |
|---|---|---|
| 5,835,726 A | 11/1998 | Shwed et al. |
| 5,856,972 A | 1/1999 | Riley et al. |
| 5,898,679 A | 4/1999 | Brederveld et al. |
| 5,956,485 A | 9/1999 | Perlman |
| 6,012,096 A | 1/2000 | Link et al. |
| 6,058,431 A | 5/2000 | Srisuresh et al. |
| 6,128,623 A | 10/2000 | Mattis et al. |
| 6,128,624 A | 10/2000 | Papierniak et al. |
| 6,128,627 A | 10/2000 | Mattis et al. |
| 6,128,664 A | 10/2000 | Yanagidate et al. |
| 6,151,584 A | 11/2000 | Papierniak et al. |
| 6,151,601 A | 11/2000 | Papierniak et al. |
| 6,152,824 A | 11/2000 | Rothschild et al. |
| 6,157,368 A | 12/2000 | Faeger |
| 6,292,834 B1 | 1/2001 | Ravi et al. |
| 6,208,649 B1 | 3/2001 | Kloth |
| 6,209,003 B1 | 3/2001 | Mattis et al. |
| 6,212,565 B1 | 4/2001 | Gupta |
| 6,212,633 B1 | 4/2001 | Levy et al. |
| 6,289,358 B1 | 9/2001 | Mattis et al. |
| 6,292,880 B1 | 9/2001 | Mattis et al. |
| 6,327,630 B1 | 12/2001 | Carroll et al. |
| 6,333,931 B1 | 12/2001 | LaPier et al. |
| 6,349,210 B1 | 2/2002 | Li |
| 6,353,891 B1 | 3/2002 | Borella et al. |
| 6,375,572 B1 | 4/2002 | Masuyama |
| 6,389,462 B1 | 5/2002 | Cohen et al. |
| 6,393,488 B1 | 5/2002 | Araujo |
| 6,405,104 B1 | 6/2002 | Dougherty |
| 6,421,347 B1 | 7/2002 | Borgstahl et al. |
| 6,487,583 B1 | 11/2002 | Harvey et al. |
| 6,487,600 B1 | 11/2002 | Lynch |
| 6,535,511 B1 | 3/2003 | Rao |
| 6,549,786 B2 | 4/2003 | Cheung et al. |
| 6,553,515 B1 | 4/2003 | Gross et al. |
| 6,560,636 B2 | 5/2003 | Cohen |
| 6,581,108 B1 | 6/2003 | Denison et al. |
| 6,590,865 B1 | 7/2003 | Ibaraki et al. |
| 6,616,531 B1 | 9/2003 | Mullins |
| 6,618,757 B1 | 9/2003 | Babbitt et al. |
| 6,636,898 B1 | 10/2003 | Ludovici et al. |
| 6,640,241 B1 | 10/2003 | Ozzie et al. |
| 6,641,241 B2 | 10/2003 | Ozzie et al. |
| 6,641,481 B1 | 11/2003 | Mai et al. |
| 6,661,799 B1 | 12/2003 | Molitor |
| 6,667,972 B1 | 12/2003 | Foltan et al. |
| 6,668,283 B1 | 12/2003 | Sitaraman et al. |
| 6,690,678 B1 | 2/2004 | Basso et al. |
| 6,701,344 B1 | 3/2004 | Holt et al. |
| 6,704,574 B2 | 3/2004 | Lin |
| 6,712,697 B2 | 3/2004 | Acres |
| 6,757,255 B1 | 6/2004 | Aoki et al. |
| 6,760,775 B1 | 7/2004 | Anerousis et al. |
| 6,772,219 B1 | 8/2004 | Shobatake |
| 6,779,017 B1 | 8/2004 | Lamberton et al. |
| 6,779,035 B1 | 8/2004 | Gbadegesin |
| 6,789,126 B1 | 9/2004 | Saulpaugh et al. |
| 6,799,255 B1 | 9/2004 | Blumenau et al. |
| 6,807,575 B1 | 10/2004 | Emaru et al. |
| 6,816,703 B1 | 11/2004 | Wood et al. |
| 6,829,634 B1 | 12/2004 | Holt et al. |
| 6,848,997 B1 | 2/2005 | Hashimoto et al. |
| 6,891,801 B1 | 5/2005 | Herzog |
| 6,899,628 B2 | 5/2005 | Leen et al. |
| 6,920,501 B2 | 7/2005 | Chu et al. |
| 6,934,745 B2 | 8/2005 | Krautkremer |
| 6,978,294 B1 | 12/2005 | Adams et al. |
| 7,000,025 B1 * | 2/2006 | Wilson .................... 709/235 |
| 7,016,942 B1 | 3/2006 | Odom |
| 7,017,138 B2 | 3/2006 | Zirojevic et al. |
| 7,035,911 B2 | 4/2006 | Lowrey et al. |
| 7,043,641 B1 | 5/2006 | Martinek et al. |
| 7,065,579 B2 | 6/2006 | Traversat et al. |
| 7,082,316 B2 | 7/2006 | Eiden et al. |
| 7,096,006 B2 | 8/2006 | Lai et al. |
| 7,107,348 B2 | 9/2006 | Shimada et al. |
| 7,120,429 B2 | 10/2006 | Minear et al. |
| 7,123,608 B1 | 10/2006 | Scott et al. |
| 7,127,613 B2 | 10/2006 | Pabla et al. |
| 7,130,921 B2 | 10/2006 | Goodman et al. |
| 7,133,368 B2 | 11/2006 | Zhang et al. |
| 7,134,961 B2 | 11/2006 | Hora |
| 7,155,515 B1 | 12/2006 | Brown et al. |
| 7,155,518 B2 | 12/2006 | Forslow |
| 7,168,089 B2 | 1/2007 | Nguyen et al. |
| 7,174,382 B2 | 2/2007 | Ramanathan et al. |
| 7,177,950 B2 | 2/2007 | Narayan et al. |
| 7,177,951 B1 | 2/2007 | Dykeman et al. |
| 7,185,138 B1 | 2/2007 | Galicki |
| 7,194,654 B2 | 3/2007 | Wray et al. |
| 7,197,565 B2 | 3/2007 | Abdelaziz et al. |
| 7,203,841 B2 | 4/2007 | Jackson et al. |
| 7,216,359 B2 | 5/2007 | Katz et al. |
| 7,240,093 B1 | 7/2007 | Danieli et al. |
| 7,243,141 B2 | 7/2007 | Harris |
| 7,254,709 B1 | 8/2007 | Richard |
| 7,263,070 B1 | 8/2007 | Delker et al. |
| 7,272,636 B2 | 9/2007 | Pabla |
| 7,321,928 B2 | 1/2008 | Feltin et al. |
| 7,340,500 B2 | 3/2008 | Traversat et al. |
| 7,346,015 B2 | 3/2008 | Shipman |
| 7,392,375 B2 | 6/2008 | Bartram et al. |
| 7,398,388 B2 | 7/2008 | Xu et al. |
| 7,407,434 B2 | 8/2008 | Thomas et al. |
| 7,426,185 B1 | 9/2008 | Musacchio et al. |
| 7,429,215 B2 | 9/2008 | Rozkin et al. |
| 7,451,490 B2 | 11/2008 | Pirich et al. |
| 7,457,279 B1 | 11/2008 | Scott et al. |
| 7,489,631 B2 | 2/2009 | Ilan |
| 7,529,193 B2 | 5/2009 | Zimmerman et al. |
| 7,533,172 B2 | 5/2009 | Traversat et al. |
| 7,573,886 B1 | 8/2009 | Ono |
| 7,680,047 B2 | 3/2010 | Vadlakonda et al. |
| 7,788,354 B2 | 8/2010 | Nag |
| 7,792,902 B2 | 9/2010 | Chatani |
| 7,803,052 B2 | 9/2010 | Multerer et al. |
| 7,831,666 B2 | 11/2010 | Chatani |
| 7,859,998 B2 | 12/2010 | Wade et al. |
| 2001/0005368 A1 | 6/2001 | Rune |
| 2001/0017856 A1 | 8/2001 | Asokan et al. |
| 2001/0021188 A1 | 9/2001 | Fujimori et al. |
| 2001/0044339 A1 | 11/2001 | Cordero et al. |
| 2001/0046213 A1 | 11/2001 | Sakoda |
| 2002/0002074 A1 | 1/2002 | White et al. |
| 2002/0006114 A1 | 1/2002 | Bjelland et al. |
| 2002/0013838 A1 | 1/2002 | Kushida et al. |
| 2002/0016826 A1 | 2/2002 | Johansson et al. |
| 2002/0035604 A1 | 3/2002 | Cohen et al. |
| 2002/0049841 A1 | 4/2002 | Johnson et al. |
| 2002/0055989 A1 | 5/2002 | Stringer-Calvert et al. |
| 2002/0075844 A1 | 6/2002 | Hagen |
| 2002/0085097 A1 | 7/2002 | Colmenarez et al. |
| 2002/0097732 A1 | 7/2002 | Worster et al. |
| 2002/0107786 A1 | 8/2002 | Lehmann-Haupt et al. |
| 2002/0107935 A1 | 8/2002 | Lowery et al. |
| 2002/0119821 A1 | 8/2002 | Sen et al. |
| 2002/0138471 A1 | 9/2002 | Dutta et al. |
| 2002/0143855 A1 | 10/2002 | Traversat et al. |
| 2002/0147810 A1 | 10/2002 | Traversat et al. |
| 2002/0161821 A1 | 10/2002 | Narayan et al. |
| 2002/0183004 A1 | 12/2002 | Fulton et al. |
| 2002/0184310 A1 | 12/2002 | Traversat et al. |
| 2002/0184311 A1 | 12/2002 | Traversat et al. |
| 2003/0027634 A1 | 2/2003 | Matthews, III |
| 2003/0028585 A1 | 2/2003 | Yeager et al. |
| 2003/0045359 A1 | 3/2003 | Leen et al. |
| 2003/0046292 A1 | 3/2003 | Subramanian et al. |
| 2003/0051052 A1 | 3/2003 | Shteyn et al. |
| 2003/0055892 A1 | 3/2003 | Huitema et al. |
| 2003/0055978 A1 | 3/2003 | Collins |
| 2003/0079003 A1 | 4/2003 | Burr |
| 2003/0084282 A1 | 5/2003 | Taruguchi |
| 2003/0097408 A1 | 5/2003 | Kageyama et al. |
| 2003/0104829 A1 | 6/2003 | Alzoubi et al. |
| 2003/0115258 A1 | 6/2003 | Baumeister et al. |
| 2003/0126229 A1 | 7/2003 | Kantor et al. |
| 2003/0126245 A1 | 7/2003 | Feltin et al. |

| | | |
|---|---|---|
| 2003/0135625 A1 | 7/2003 | Fontes et al. |
| 2003/0152034 A1 | 8/2003 | Zhang et al. |
| 2003/0158961 A1 | 8/2003 | Nomura et al. |
| 2003/0162556 A1 | 8/2003 | Libes |
| 2003/0177187 A1 | 9/2003 | Levine et al. |
| 2003/0182421 A1 | 9/2003 | Faybishenko et al. |
| 2003/0182428 A1 | 9/2003 | Li et al. |
| 2003/0191828 A1 | 10/2003 | Ramanathan et al. |
| 2003/0217096 A1 | 11/2003 | McKelvie et al. |
| 2003/0217135 A1 | 11/2003 | Chatani et al. |
| 2003/0227939 A1 | 12/2003 | Yukie et al. |
| 2003/0229779 A1 | 12/2003 | Morais et al. |
| 2003/0229789 A1 | 12/2003 | Morais et al. |
| 2003/0233281 A1 | 12/2003 | Takeuchi et al. |
| 2004/0007618 A1 | 1/2004 | Oram et al. |
| 2004/0015548 A1 | 1/2004 | Lee |
| 2004/0018839 A1 | 1/2004 | Andric et al. |
| 2004/0024879 A1 | 2/2004 | Dingman et al. |
| 2004/0063497 A1 | 4/2004 | Gould |
| 2004/0085947 A1 | 5/2004 | Ekberg et al. |
| 2004/0087369 A1 | 5/2004 | Tanaka |
| 2004/0088369 A1 | 5/2004 | Yeager et al. |
| 2004/0103179 A1 | 5/2004 | Damm et al. |
| 2004/0110563 A1 | 6/2004 | Tanaka |
| 2004/0133631 A1 | 7/2004 | Hagen et al. |
| 2004/0139228 A1 | 7/2004 | Takeda et al. |
| 2004/0162871 A1 | 8/2004 | Pabla et al. |
| 2004/0181463 A1 | 9/2004 | Goldthwaite et al. |
| 2004/0207880 A1 | 10/2004 | Thakur |
| 2004/0212589 A1 | 10/2004 | Hall et al. |
| 2004/0236863 A1 | 11/2004 | Shen et al. |
| 2004/0236945 A1 | 11/2004 | Risan et al. |
| 2004/0243665 A1 | 12/2004 | Markki et al. |
| 2004/0249891 A1 | 12/2004 | Khartabil et al. |
| 2004/0254977 A1 | 12/2004 | Zhang |
| 2004/0267876 A1 | 12/2004 | Kakivaya et al. |
| 2005/0007964 A1 | 1/2005 | Falco et al. |
| 2005/0015626 A1 | 1/2005 | Chasin |
| 2005/0020354 A1 | 1/2005 | Nguyen et al. |
| 2005/0026698 A1 | 2/2005 | Pirich et al. |
| 2005/0063409 A1 | 3/2005 | Oommen |
| 2005/0064939 A1 | 3/2005 | McSheffrey et al. |
| 2005/0065632 A1 | 3/2005 | Douglis et al. |
| 2005/0074007 A1* | 4/2005 | Samuels et al. ............... 370/392 |
| 2005/0080858 A1 | 4/2005 | Pessach |
| 2005/0086287 A1 | 4/2005 | Datta |
| 2005/0086288 A1 | 4/2005 | Datta et al. |
| 2005/0086329 A1 | 4/2005 | Datta et al. |
| 2005/0086350 A1 | 4/2005 | Mai |
| 2005/0086369 A1 | 4/2005 | Mai et al. |
| 2005/0105526 A1 | 5/2005 | Stiemerling et al. |
| 2005/0141522 A1 | 6/2005 | Kadar et al. |
| 2005/0149481 A1 | 7/2005 | Hesselink et al. |
| 2005/0221858 A1 | 10/2005 | Hoddie |
| 2005/0250487 A1 | 11/2005 | Miwa |
| 2005/0251577 A1 | 11/2005 | Guo et al. |
| 2005/0259637 A1 | 11/2005 | Chu et al. |
| 2005/0262411 A1 | 11/2005 | Vertes |
| 2006/0063587 A1 | 3/2006 | Manzo |
| 2006/0067920 A1 | 3/2006 | Jensen |
| 2006/0068702 A1 | 3/2006 | Miwa |
| 2006/0075127 A1 | 4/2006 | Juncker et al. |
| 2006/0084504 A1 | 4/2006 | Chan et al. |
| 2006/0111979 A1 | 5/2006 | Chu |
| 2006/0114918 A1* | 6/2006 | Ikeda et al. ................... 370/408 |
| 2006/0209822 A1 | 9/2006 | Hamamoto |
| 2006/0218624 A1 | 9/2006 | Ravikumar et al. |
| 2006/0288103 A1 | 12/2006 | Gobara et al. |
| 2007/0058792 A1 | 3/2007 | Chaudhari et al. |
| 2007/0061460 A1 | 3/2007 | Khan et al. |
| 2007/0077981 A1 | 4/2007 | Hungate et al. |
| 2007/0081459 A1 | 4/2007 | Segel et al. |
| 2007/0115963 A1* | 5/2007 | Vadlakonda et al. ......... 370/389 |
| 2007/0150552 A1 | 6/2007 | Harris et al. |
| 2007/0165629 A1 | 7/2007 | Chaturvedi et al. |
| 2007/0191109 A1 | 8/2007 | Crowder et al. |
| 2007/0198418 A1 | 8/2007 | MacDonald et al. |
| 2007/0208748 A1 | 9/2007 | Li |
| 2007/0213124 A1 | 9/2007 | Walker et al. |
| 2007/0217436 A1 | 9/2007 | Markley et al. |
| 2007/0237153 A1 | 10/2007 | Slaughter et al. |
| 2009/0077245 A1 | 3/2009 | Smelyansky et al. |
| 2009/0094370 A1 | 4/2009 | Jacob et al. |
| 2009/0111532 A1 | 4/2009 | Slaughter et al. |
| 2009/0138610 A1 | 5/2009 | Gobara et al. |
| 2009/0228593 A1 | 9/2009 | Takeda |
| 2009/0240821 A1 | 9/2009 | Juncker et al. |
| 2011/0035501 A1 | 2/2011 | Takeda |

FOREIGN PATENT DOCUMENTS

| | | |
|---|---|---|
| EP | 1 107 508 | 6/2001 |
| EP | 1 374 959 | 5/2003 |
| JP | 2001 53901 | 2/2001 |
| JP | 2002 10321 | 1/2002 |
| JP | 2004 135778 | 5/2004 |
| JP | 2004 136009 | 5/2004 |
| JP | 2004 141225 | 5/2004 |
| JP | 2005 319047 | 11/2005 |
| JP | 2005 323116 | 11/2005 |
| JP | 2005 323117 | 11/2005 |
| WO | WO 99/35799 | 7/1999 |
| WO | WO 01/97485 | 12/2001 |
| WO | WO 02/03217 | 1/2002 |
| WO | 02/11366 | 2/2002 |
| WO | WO 02/23822 | 3/2002 |
| WO | 03/069495 | 8/2003 |
| WO | 2004/038541 A2 | 5/2004 |
| WO | WO2004063843 | 7/2004 |
| WO | WO2005088466 | 9/2005 |
| WO | WO2007041417 | 4/2007 |
| WO | WO 2009/073312 | 6/2009 |

OTHER PUBLICATIONS

"Packetization Layer Path MTU Discovery", M. Mathis and J. Heffner found on the internet at http://www.ietf.org:80/rfc/rfc4821.txt?number=4821, Mar. 2007.

Sony Computer Entertainment Incorporated, Toshiba Corporation 2005 "Cell Broadband Engine Architecture" Aug. 8, 2005, Version 1.0.

Definition of word "determine" from Determine—Definition and More from the Free Merriam-Webster Dictionary—download from link http://www.merriam-webster.com/dictionary/determine on Mar. 16, 2010, 2 pages.

The International Search Report and The Written Opinion of the International Searching Authority dated Jul. 7, 2009 issued for the International Patent Application No. PCT/US2006/083002.

Office Action dated Jun. 24, 2010 issued for U.S. Appl. No. 12/267,269.

Arno Wacker et al—"A NAT Traversal Mechanism for Peer-to Peer Networks"—Eighth International Conference on Peer-to Peer Computing (P2P'08), 2008. IEEE, pp. 81-83.

Jim Dowling et al.—"Improving ICE Service Selection in a P2P System using the Gradient Topology"—First International Conference on Self-Adaptive and Self-Organizing Systems (SASO 07), 2007, IEEE, pp. 285-288.

European Search Report dated Jan. 28, 2010 issued for European patent application No. 99252219.2.

J. Rosenberg, Simple Traversal of UDP Through Network Address Translators (NAT), Behave Inernet-Draft, Jul. 17, 2005.

J. Rosenberg, Interactive Connectivity Establishment (ICE): A methodology for Network Address Translator (NAT) Traversal for Offer/Answer Protocols, MMusic Internet-Draft, Jul. 17, 2005.

F. Audet, NAT Behavioral Requirements for Unicast UDP, Behave Internet -Draft, Jul. 15, 2005.

J. Rosenberg, Interactive Connectivity Establishment (ICE): A Methodology for Network Address Translator (NAT) Traversal for Multimedia Session Establishment Protocols, MMusic Internet -Draft, Oct. 25, 2004.

J. Rosenberg, Traversal Using Relay NAT (TURN), MIDCOM Internet-Draft, Oct. 20, 2003.

Y. Takeda, Symmetric NAT Traversal Using STUN, Internet Engineering Task Force, Jun. 2003.

J. Rosenberg, Interactive Connectivity Establishment (ICE): A Methodology for Network Address Translator (NAT) Traversal for Offer/Answer Protocols, MMusic Internet-Draft, Jan. 16, 2007.

J. Rosenberg, Interactive Connectivity Establishment (ICE): A Methodology for Network Address Translator (NAT) Traversal for Multimedia Session Establishment Protocols, MMusic Internet-Draft, Jul. 19, 2004.

J Rosenberg, STUN- Simple Traversal of User Datagram Protocols (UDP) Through Network Address Translator (NATs), Network Working Group, Mar. 2003.

Office Action dated Mar. 24, 2010 issued for U.S. Appl. No. 12/235,409.

Final Office Action dated Jul. 19, 2010 issued for U.S. Appl. No. 12/235,409.

Final Office Action dated Apr. 12, 2010 issued for U.S. Appl. No. 11/243,853.

Office Action dated Oct. 13, 2009 issued for U.S. Appl. No. 11/243,853.

Office Action dated Aug. 31, 2010 issued for U.S. Appl. No. 11/243,853.

Final Office Action dated May 28, 2009 issued for U.S. Appl. No. 11/243,853.

Office Action dated Aug. 31, 2010 issued for U.S. Appl. No. 12/235,438.

Notice of Allowance and Fees Due dated Jul. 22, 2010 issued for U.S. Appl. No. 12/043,080.

PCT International Search Report and Written Opinion of the Internal Searching Authority dated Sep. 28, 2009 for international application No. PCT/US2009/034913.

PCT International Search Report and Written Opinion of the Internal Searching Authority dated Jan. 24, 2007 for international application No. PCT/US2006/38285.

The International Search Report of the Written Opinion of the International Searching Authority dated Nov. 6, 2009 for the international application No. PCT/US2009/057192.

Office Action dated Jun. 4, 2009 issued for U.S. Appl. No. 10/215,899.

Office Action dated Mar. 13, 2008 issued for U.S. Appl. No. 10/215,899.

Office Action dated Sep. 11, 2007 issued for U.S. Appl. No. 10/215,899.

Office Action dated Mar. 22, 2007 issued for U.S. Appl. No. 10/215,899.

Office Action dated Aug. 12, 2005 issued for U.S. Appl. No. 10/215,899.

NAT and Network Games, p. 1-5, entitled: Just the FAQs, Ma'am, http://www.u.arizona.edu/~trw/games/nat.htm, Oct. 23, 2002.

BroadbandReports.com, How to hookup our console to the net—section all, pp. 1 to 22, http://www.dslreports.com/fag/onlinegaming/all, Oct. 23, 2002.

Do I use NAT?, pp. 1 to 3, http://www.u.arizona.edu/~trw/games/nat or not.php, Oct. 23. 2002.

Home Toys Article, HAI Omni Solution, UPnP NAT Traversal FAQ, pp. 1 to 4 http://hometoys.com/htinews/aug01/articles/microsoft/upnp.htm, Nov. 11, 2002.

InternetGatewayDevice: I Device Template Version 1.01, Copyright 1999-2001 Microsoft Corporation, 16 pgs.

STUN—Simple Traversal of UDP Thrugh NATs, J. Rosenberg et al. pp. 1-29, Copyright The Internet Society, Sep. 2002.

Traversal Using Relay NAT (TURN), Rosenberg, Weinberger, Huitema, Mahy, Nov. 14, 2001, pp. 1 to 17.

http://www.dslreports.com/ip, Oct. 23, 2002.

Network Address Translators. Microsoft Corporation Jan. 2001, http://msdn.microsoft.com/library/default.asp?irl=/library/en-us/dnplay/html/nats2-msdn.asp.

Nat and Peer-to-Peer networking, Dan Kegel. Copyright 1999 http://alumnus.caltech.edu/-dank/peer-nat.html.

Office Action dated May 5, 2009 issued for U.S. Appl. No. 11/708,988.

Final Office Action dated Oct. 29, 2009 issued for U.S. Appl. No. 11/708,988.

Office Action dated Feb. 22, 2010 issued for U.S. Appl. No. 11/708,988.

Notice of Allowance and Fee(s) Due dated Oct. 28, 2009 for U.S. Appl. No. 10/215,899.

Office Action issued by the European Patent Office (EPO) on Feb. 17, 2010 for European patent application No. 09022219.2.

Office Action issued by the USPTO on Apr. 15, 2010 for U.S. Appl. No. 12/235,438.

J. Postel, "Uniform Datagram Protocol" in IETF RFC 768, Aug. 28, 1980—download from link http://tools.ietf.org/html/rfc768 on Nov. 4, 2010, 3 pages.

U.S. Appl. No. 12/910,624 to Yutaka Takeda, filed Oct. 22, 2010 and entitled "Traversal of Symmetric Network Address Translator for Multiple Simultaneous Connections".

Office Action dated Jan. 21, 2011 for U.S. Appl. No. 12/267,254.

Steven Hessing: "Peer to Peer Messaging Protocol (PPMP)" Internet Draft, Apr. 2002, pp. 1-57, XP015001173.

Song Jiang et al: "FloodTrial: an efficient file search technique in unstructured peeito-peer systems" Globecom 2003, vol. 5, I Dec. 2003, pp. 2891-2895, XP010678188.

Dutkiewicz E Ed—Institute of Electrical and Electronics Engineers: "Impact of transmit range on throughput performance in mobile ad hoc networks" ICC 2001. 2001 IEEE International Conference on COMMUNICAnONS. Conference Record. Helsinky, Finland, June II 14,2001, IEEE International Conference on Communications, New York, NY IEEE, US, vol. 1 of 10, Jun. 11, 2001, pp. 2933-2937, XP 010553662 ISBN: 0-7803-7097-1.

Kim Y Ed—Association for Computing Machinery: "Simple and Fault—Tolerant Key Agreement by Dynamic Collaborative Groups", Proceedings of the 7m ACM Conference on Computer and Communications Security. CS 2000. Athens, Greece, Nov. 1-4, 2000, ACM Conference on Computer and Communications Security, New Your, NY: ACM, US, vol. Conf. 7, Nov. 1, 2000, pp. 1 38, XP 002951317 Isbn: 1 -58113 - 203 4.

Baughman et al., Cheat-proof playout for centralized and distributed online games, INFOCOM2001. Twentieth Annual Joint Conference of the IEEE Computer and Communications Societies. Proceedings. IEEE Publication Date: 2226 Apr. 2001, On pp. 104-113, vol. 1.

* cited by examiner

NETWORK COMMUNICATION WITH PATH MTU SIZE DISCOVERY

FIELD OF THE INVENTION

This invention generally relates to network communications and more particularly to discovery of a maximum transmission unit (MTU) size in a path between two nodes of a network.

BACKGROUND OF THE INVENTION

When one Internet Protocol (IP) host has a large amount of data to send to another host, the data is transmitted as a series of Internet Protocol (IP) datagrams. It is often preferable that these datagrams be of a largest size that does not require fragmentation anywhere along the path from the source to the destination. This datagram size is referred to as the Maximum Transmission unit (MTU) for the path and is sometimes referred to as the Path MTU or PMTU. The Path MTU is equal to the minimum of the MTUs of each hop in the path.

Fragmenting a packet involves dividing the packet into smaller packets and adding a header to each smaller packet. Since each fragment has the same header overhead as the original message, fragmenting packets adds to the total number of bytes that need to be transmitted in order to transmit the message. This can slow down transmission. It is therefore advantageous to discover Path MTU in order to avoid fragmenting packets.

A shortcoming of the prior art is the lack of an adequate mechanism for discovering the MTU of an arbitrary path between two hosts. Prior art techniques for Path MTU discovery are described e.g., in RFC 1191, "Path MTU Discovery", by J. Mogul and S. Deering, which is available on the Internet at http://www.ietf.org/rfc/rfc1191.txt?number=1191, the contents of which are incorporated herein by reference. RFC 1191 describes a technique for Path MTU discovery by setting the "do not fragment" (DF) flag on packets sent by the host. If a router in the path has an MTU size smaller than the packet size, an Internet Control Message Protocol (ICMP) error is returned and the packet is dropped. Otherwise, the packet is received by the intended recipient, which verifies receipt of the packet. Unfortunately, administrative privilege is often required in order to be able to set the DF flag. In addition, not all routers are configured to provide the ICMP messages that are relied upon in this technique. In fact, most routers are not so configured.

Additional prior art path MTU discovery techniques are described by M. Mathis and J. Heffner in an internet draft titled "Packetization Layer Path MTU Discovery", a copy of which is available on the internet at: <http://www.ietf.org:80/rfc/rfc4821.txt?number=4821>, the contents of which are incorporated herein by reference.

This RFC addresses issues with classic Path MTU discovery, which include "ICMP black holes" and ICMP blockage by firewalls. However, Packetization Layer Path MTU Discovery (PLPMTUD) technique still has a number of drawbacks. For example, PLPMTUD techniques must be able to set the do not fragment (DF) bit to 1 for packet loss detection. Unfortunately, the DF bit cannot be controlled from applications. In addition, PLPMTUD needs to be supported by both IP layer and the TCP/IP layer to work, and is not yet widely implemented.

It is within this context that embodiments of the present invention arise.

BRIEF DESCRIPTION OF THE DRAWINGS

Embodiments of the present invention may be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Embodiments of the present invention are directed to methods and apparatus for discovery of a maximum transmission unit (MTU) size in a path between a first host and a second host connected by a network. A plurality of test packets of varying transmission unit (TU) size may be sent from the first host to the second host. A "do not fragment" (DF) flag for the test packets is not set. It is determined whether one or more of the test packets were received by the second host. An estimated path MTU size may then be calculated based on one or more patterns of receipt of the test packets by the second host.

TECHNICAL BACKGROUND

Figure 1:
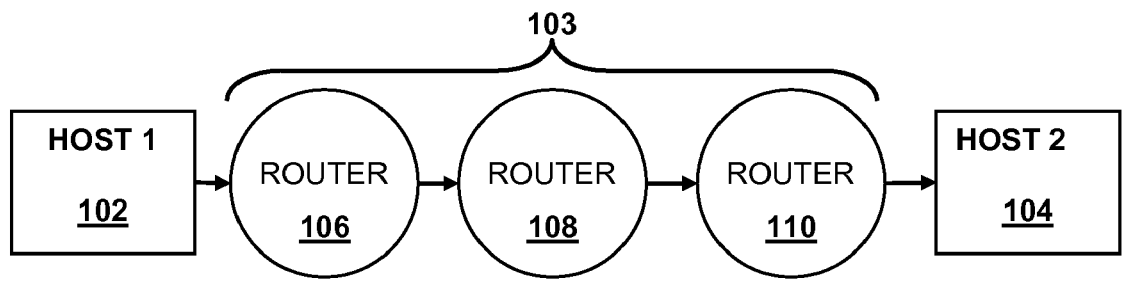
FIG. 1 is a block diagram illustrating a network path between two hosts.

Embodiments of the present invention may be understood in the context of network communications. FIG. 1 illustrates an example of network communication between Host 1 102 and Host 2 104. By way of example, the hosts may be any network capable device. Such devices include, but are not limited to computers, hand held internet browsers and/or email devices, Voice over Internet Protocol (VoIP) phones, video game consoles, hand held video game devices, and the like. Messages from Host 1 travel to Host 2 over a network path 103 via routers 106, 108, and 110. Each router may have a different Maximum Transmission Unit (MTU). In this example, router 106 has an MTU of 1500 bytes, router 108 has an MTU of 1000 bytes and router 110 has an MTU of 1500 bytes. The path MTU for the path 103 is the smallest MTU of any router in the path, which is 1000 bytes in this example.

Figure 2:
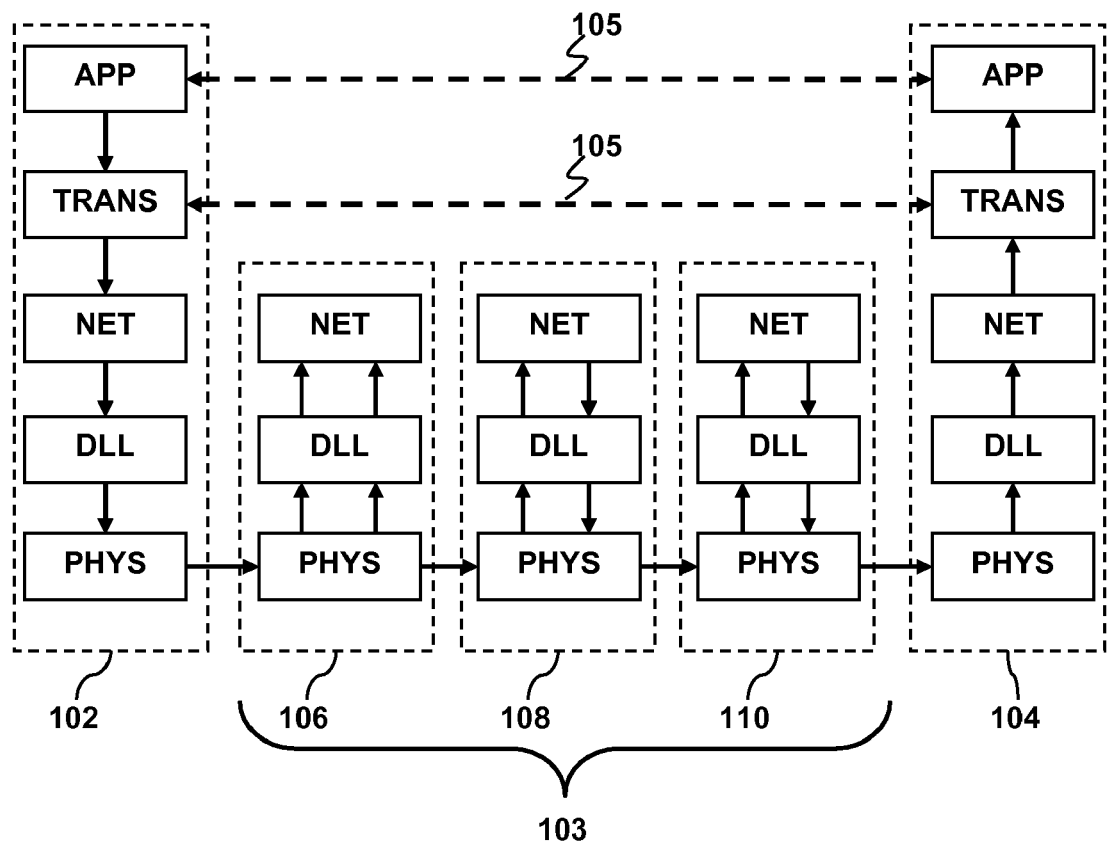
FIG. 2 is a block diagram illustrating the protocol stacks in the hosts and routers of FIG. 1.

The Hosts 102, 104 and routers 106, 108, 110 may be configured to communicate with each other according to a network protocol. FIG. 2 illustrates an example of a network protocol configuration for the situation shown in FIG. 1. By way of example, each host device 102, 104 may be configured (either in software or hardware or some combination of both) with a network protocol stack having five layers: an Application layer APP, a Transport layer TRANS, a Network layer NET (sometimes referred to as the IP layer), a Data Link Layer DLL and a Physical layer PHYS. These layers are well-known to those of skill in the art.

The Hosts 102, 104 typically implement all five layers. The routers 106, 108, 110 typically implement only the Network, Data Link and Physical layers.

By way of example, embodiments of the present invention may implement Path MTU discovery at the Application layer. Typically, the Transport layer and below are implemented in an operating system (OS) kernel and applications have no control in changing behavior at these layers. Classic PMTUD, by contrast, is typically implemented at the Transport and IP (Network) layers.

The Application layer APP represents the level at which applications access network services. This layer represents the services that directly support applications such as software for file transfers, database access, and electronic mail. Examples of application layer software include HL7, Modbus, Session Initiation Protocol (SIP), and Simple Sensor Interface Protocol (SSI). In the particular case of the TCP/IP suite, the Application layer APP may be implemented with software protocols such as Hypertext Transfer Protocol (HTTP), Session Initiation Protocol (SIP), Simple Mail Transfer Protocol (SMTP), Short Message Peer-to-Peer Protocol (SMPP), Simple Network Management Protocol (SNMP), File Transfer Protocol (FTP), Teletype Network (TELNET), Network File System (NFS), Network Time Protocol (NTP), Real-time Transport Protocol (RTP), Dynamic Host Configuration Protocol (DHCP), and Domain Name System (DNS). The Application layer APP may sometimes be divided further into a Presentation layer and a Session layer, e.g., in the Open Systems Interface (OSI) protocol. The Presentation layer translates data from the Application layer into an intermediary format. The Presentation layer may also manages security issues by providing services such as data encryption, and compresses data so that fewer bits need to be transferred on the network. The Session layer allows two applications on different computers to establish, use, and end a session. The Session layer may establish dialog control between the two computers in a session, regulating which side transmits, plus when and how long it transmits.

The Transport layer TRANS handles error recognition and recovery. For a transmitting host, the Transport layer may also repackage long messages when necessary into small packets for transmission. For a receiving host the Transport layer rebuilds packets into the original message. The Transport layer for a receiving host may also send receipt acknowledgments. Examples of particular Transport layer protocols include Transmission Control Protocol (TCP), User Datagram Protocol (UDP) and Stream Control Transmission Protocol (SCTP), all of which, and equivalents thereof, are well-known to those of skill in the art. The Transport layer TRANS is the layer that typically supports packet fragmentation. It is noted that fragmentation may take place in the Transport layer of the host originating a message or at the Transport layer of any of the routers along the path between that host and the message's intended recipient.

The Network layer NET addresses messages and translates logical addresses and names into physical addresses. It also determines the route from the source to the destination computer. The Network layer may also manages traffic problems, such as switching, routing, and controlling the congestion of data packets. Examples of particular Network layer protocols include, but are not limited to, Internet Protocol (IP), Internet Control Message Protocol (ICMP), IP Security (Ipsec), Address Resolution Protocol (ARP), Routing Information Protocol (RIP) and Open Shortest Path First (OSPF) all of which, and equivalents thereof, are well-known to those of skill in the art.

The Data Link layer DLL packages raw bits from the Physical layer PHYS into frames (logical, structured packets for data). The Data Link layer may also be responsible for transferring frames from one computer to another, without errors. After sending a frame, the Data Link layer DLL waits for an acknowledgment from the receiving computer. Examples of particular Data Link layer protocols include, but are not limited to, Point-to-Point Protocol (PPP), Serial Line Internet Protocol (SLIP) and Media Access Control (MAC) all of which, and equivalents thereof, are well-known to those of skill in the art. The Data Link layer DLL typically limits the MTU size.

The Physical layer PHYS transmits bits from one computer to another and regulates the transmission of a stream of bits over a physical medium. This layer defines how the cable is attached to the network adapter and what transmission technique is used to send data over the cable. Examples of particular Physical layer protocols and standards include, but are not limited to, RS-232, V.35, V.34, I.430, I.431, T1, E1, 10BASE-T, 100BASE-TX, POTS, SONET, DSL, 802.11a, 802.11b, 802.11g, 802.11n all of which, and equivalents thereof, are well-known to those of skill in the art.

A message originating at Host 1 102 starts at the Application layer APP and works its way down the protocol stack to the Physical layer PHYS. When the message arrives as Host 2 104, it is received at the Physical layer PHYS and works its way up the stack to the Application layer APP. In the path 103 between the two hosts 102, 104, the message is received at the Physical layer PHYS of router 106 and works its way up to the Transport layer TRANS and then back down the stack to the Physical layer PHYS for transmission to router 108. The process repeats for routers 108 and 110. In peer-to-peer situations, once a connection has been established between the hosts 102, 104 they may communicate directly by peer-to-peer connections 105, e.g., at the Application layer APP or at the Transport layer TRANS.

Path MTU Discovery Method and Apparatus

By way of example, embodiments of invention may be applied to discovery of MTU size defined at the IP (Network) layer. Alternatively, MTU size discovery as described herein may be equally applied to any supported transport protocol.

According to embodiments of the present invention, Path MTU discovery may be based on two observations. The first observation is that most routers will properly fragment packets that conform to certain Transport Layer protocols. An example of such a protocol is the Uniform Datagram Protocol (UDP). UDP is a minimal message-oriented transport layer protocol that is described, e.g., by J. Postel in IETF RFC 768, Aug. 28, 1980, which may be accessed on the Internet at http://tools.ietf.org/html/rfc768, the contents of which are incorporated herein by reference. In the Internet protocol (IP) suite, UDP may provide a very simple interface between a network layer below (e.g., IPv4) and a session layer or application layer above. UDP is often described as being a connectionless protocol. As used herein connectionless, refers to network protocols in which a host can send a message without establishing a connection with the recipient. That is, the host simply puts the message onto the network with the destination address and hopes that it arrives. Other examples of connectionless protocols include Ethernet and IPX. UDP is typically used for message broadcast (sending a message to all on a local network) or multicast (sending a message to all subscribers). Common network applications that use UDP include the Domain Name System (DNS), streaming media applications such as Internet Protocol Television (IPTV), Voice over IP (VoIP), Trivial File Transfer Protocol (TFTP) and online games.

The second observation is that routers tend to exhibit one or two particular types of bandwidth limitation behavior. Specifically, router bandwidth limitation may be classified as being either packet rate limited or bit rate limited. In a packet rate limited router, the data transmission rate is determined by a number of packets the router can transmit per unit time. For a packet rate limited router, the size of the packets does not affect the number of packets the router can send per unit time as long as the packets are no larger than some maximum packet size, which determines the MTU for that router. Packet rate limited routers are sometimes referred to herein as being packet-per-second (pps) limited. For a pps limited router, it makes sense to send packets that are as large as possible in order to optimize the data transmission rate. For a bit rate limited router, by contrast, the data transmission rate is determined by a maximum number of bits per unit time that is independent of the packet size. Bit-rate limited routers are sometimes referred to herein as being bit-per-second (bps) limited. It is noted that both bps-limited routers and pps-limited routers may fragment a packet depending on the MTU set to the router.

Figure 3A:
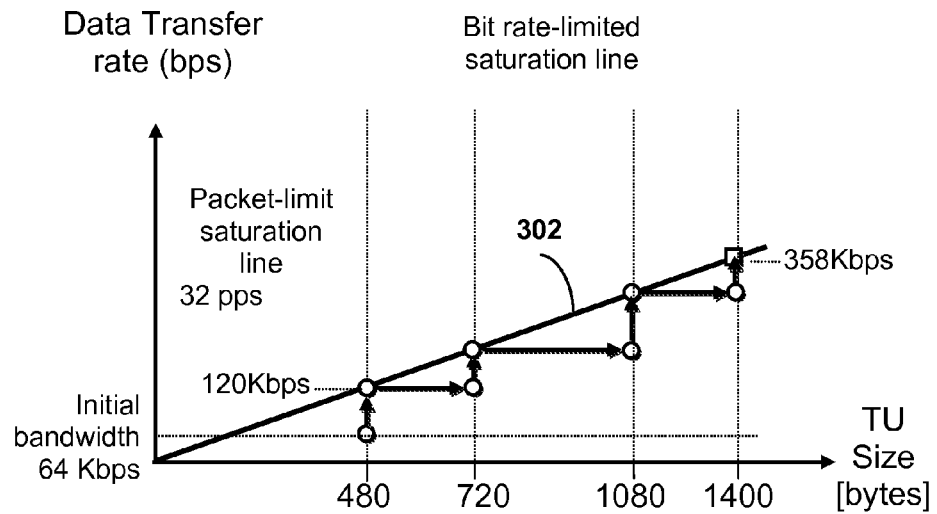
FIG. 3A is a graph illustrating the data transmission rate of a packet rate limited router as a function of packet size.
Figure 3B:
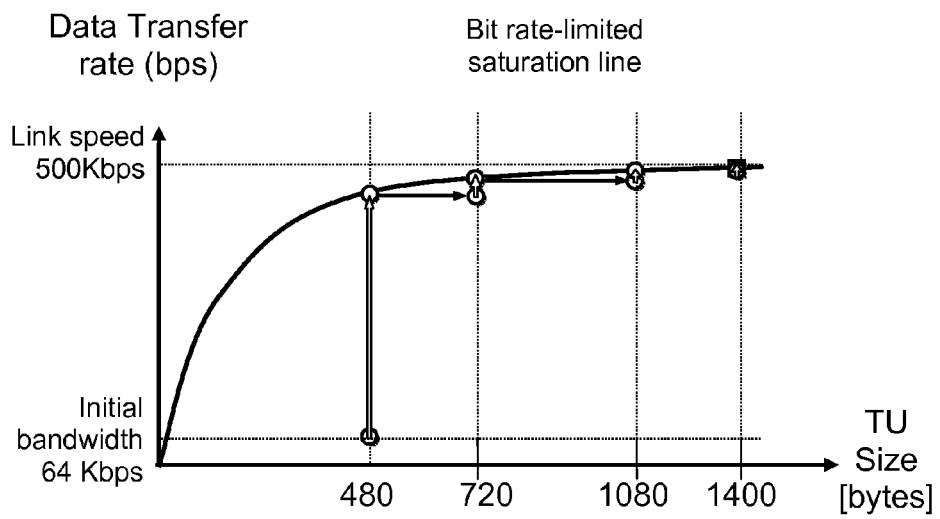
FIG. 3B is a graph illustrating the data transmission rate of a bit rate limited router as a function of packet size.

The difference in behavior of the packet rate limited and bit rate limited routers is illustrated in FIGS. 3A-3B. Specifically, FIG. 3A graphically depicts the data transfer rate for UDP packets as a function of transmission unit TU size for a packet rate limited router. Packets at an initial size are sent at an initial bandwidth $BW_0$ (e.g., 64 Kilobits per second (Kbps)). Preferably the sending host has the ability to "throttle" the bandwidth with which the packets are sent. Such a "slow-start" approach is often useful since packets are queued at each node. A long queue increases latency, which is undesirable. Long queues also tend to take a long time to be recovered. Embodiments of the present invention avoid this by adjusting the sending bandwidth BW while keeping the TU size fixed. Each packet includes a request for the receiving host to provide the data transfer rate (e.g., in bits per second (bps) for the received packets. As the bandwidth is increased, the data transfer rate for the received packets will continue to increase until the bandwidth reaches a packet-limit saturation. At this point, increasing the bandwidth does not further increase the data transfer rate for the packets since the router transmits a fixed number of packets per second. For packets that are smaller than the router's MTU, the packet-limit saturated data transfer rate increases approximately linearly as the packet size increases as indicated by the line 302. For example, if the path contains a router having a packet limit of 32 packets per second and an initial packet size of, e.g., 480 8-bit bytes, the data transfer rate for the packets will saturate at about 120 Kbps. If the packet size is increased by 50%, e.g., to 720 bytes, but remains below the MTU size for the router, the bandwidth will saturate at about 180 Kbps. Such linear behavior is characteristic of a pps-limited router. Packets that are greater than the MTU size for the router are fragmented into two or more packets. As a result, the number of packets increases but the packet transmission rate does not. Consequently, the data transmission rate abruptly drops just beyond the MTU size. If the packet size is again increased, the data transmission rate for a pps-limited router is expected to increase in an approximately linear fashion until the packet size reaches another integer multiple of the MTU size.

Rate limitation, which may occur either intentionally or unintentionally, could happen at any layer in the protocol stack. One "intentional" case that is very common is to set up IP tables (set policies within the IP and transport layers) to throttle bandwidth. Bandwidth saturation may be detected at the receiver side by observing packet loss and increase of latency. As described above, there are a series of queues in the path. When saturation occurs somewhere in the path, a queue right before the saturation point starts accumulating packets. This may be observed as an "increase of latency" at the receiver by checking timestamps added to each packet. Eventually, the queue becomes full and packets start being dropped, which may also be observed at the receiver side by checking sequence numbers attached to each packet.

FIG. 3B graphically depicts the data transfer rate for UDP packets as a function of packet size for a bit rate limited router. It is noted that a bit rate limited router is generally not sensitive to fragmentation of the packets because it is not affected by the number of packets sent per second. For example, sending 1000 bytes/sec or 500 byte packets at 2 packets/sec is the same for a bit rate limited router. However, although the bandwidth may be more or less fixed for such a router, the data transfer rate (e.g., in bits per second) may vary due to a more or less constant latency associated with transmission of each packet. As a result of the latency, the data transfer rate for a bps-limited router will tend to increase with packet size. However, as the data transmission rate approaches a bandwidth limit $BW_L$, the transmission rate will tend to flatten off as a function of packet size.

Figure 4:
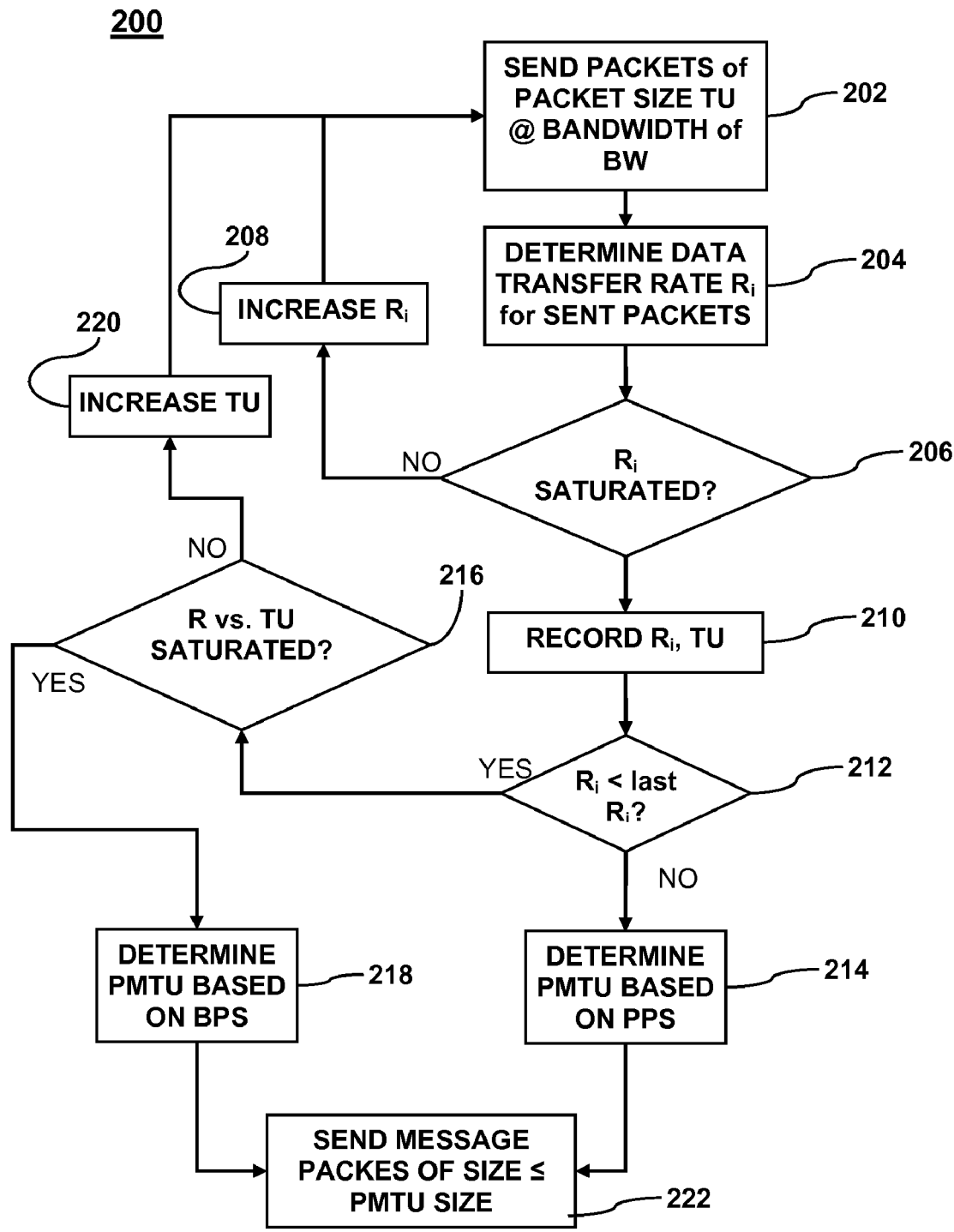
FIG. 4 is a flow diagram of a method for Path MTU discovery according to an embodiment of the present invention.
Figure 5A:
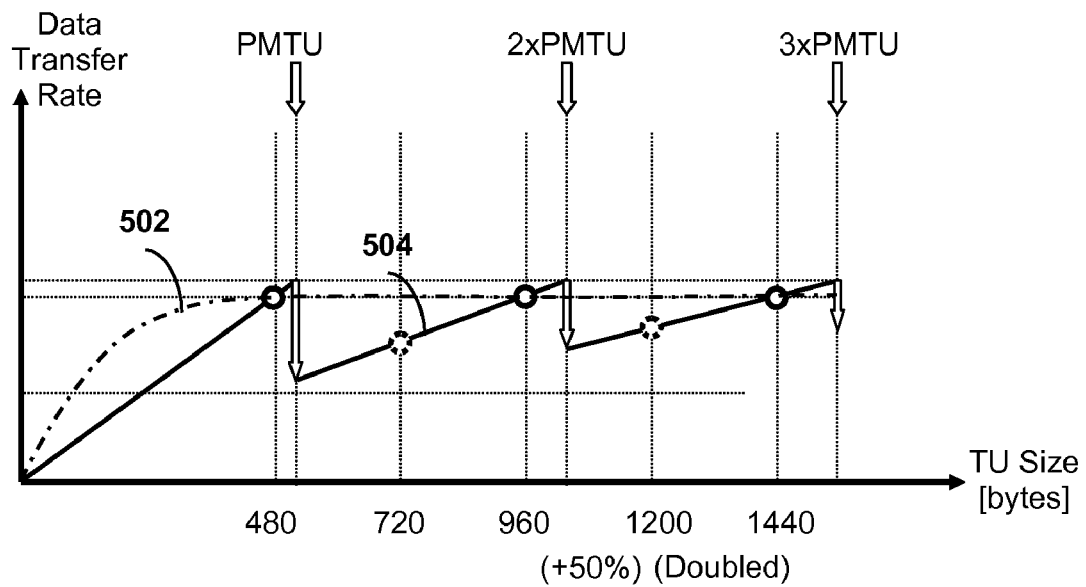
FIG. 5A is a graph illustrating an example of a false detection of a packet rate limited router.

Thus, based on an understanding of the two types of router behavior illustrated in FIGS. 3A-3B, path MTU discovery may proceed according to a method 200 as shown in FIG. 4. As indicated at 202, test packets may be transmitted from one host to a recipient (e.g., from host 102 to host 104, with a small initial TU size and a small initial transmission bandwidth BW. (See FIG. 1). The DF flag for these packets is not set so that routers along the path 103 may fragment the packets normally, if they are configured to do so. As the packets are received, the transmitting host determines the data transfer rate for the packets, as indicated at 204. By way of example, each packet may include a request for the receiving host to send back a message that indicates the data transfer rate R for the test packet. The sending host probes for saturation behavior at 206. If saturation is not observed, the transmission bandwidth BW is gradually increased with the same TU size at 208, while probing packet loss and growth of delay at receiver side. When significant packet loss or growth of delay is detected, it may be assumed that the bandwidth with the TU size is saturated. The values of TU and R may be recorded at this point as indicated at 210. The TU size may then be increased, e.g., by 50% of the initial TU size. If the bandwidth is pps limited, it is expected that the bandwidth will grow linearly with TU size until the TU size (or an integer multiple thereof) is reached. If the TU size exceeds the actual path MTU size and the bandwidth is pps-limited, the receiver will detect that the data transfer rate is less than for the previous TU size. The example in FIG. 5A shows how the data transfer rate may behave when the TU size exceeds the actual path MTU size. When TU size exceeds the path MTU size, an intermediary node that has the MTU size set will start fragmenting long packets to fit them into the MTU size. This causes an increase in the number of packets, and a consequent decrease in the transfer rate since the bandwidth is pps limited. Specifically, just above the MTU size, the packets are split into two, which results in a drop in data transfer rate by one half. Just above twice the MTU size the packets are split into three, which results in a drop in data transfer rate by one third. Just above three times the MTU size the packets are split into four, which results in a drop in data transfer rate by one fourth. By detecting this bandwidth drop, network applications can detect the path MTU size to maximize available bandwidth.

If the bandwidth is bps limited, by contrast, the bandwidth will tend to grow until it reaches a bandwidth saturation level, e.g., as shown in FIG. 3B. The data transfer rate for a bps-limited tends to flatten off without the characteristic drops seen in FIG. 5A. Thus, it is possible to determine router behavior and path MTU size by observing the dependence of data transfer rate R on TU size. By way of example, after each R and TU value have been recorded at 210 the sending host may check at 212 to determine if the latest value of R is less than the previous value of R. If so, the path MTU may be determined from the behavior of R versus TU at 214 based on a packet-rate limit assumption. If saturation of R as a function of TU (e.g., as shown in FIG. 3B) is detected at 216, the path MTU may be calculated based on a bit-rate limit assumption at 218. If such saturation behavior is not detected, the TU may be increased at 220 and the process may repeat at 202, 204, 206, etc. Once the Path MTU size has been determined, message packets of a size less than or equal to the Path MTU size may be sent over the path 103 to the second host 104, as indicated at 222. It is noted that the host that performs the path MTU discovery need not be one that sends the message packets. For example, if two or more hosts are connected to the second host 104 by the same path 103 it is possible for one of these hosts to perform path MTU discovery and notify another of these host of the path MTU. Any of these hosts may then send message packets that are less than or equal to the path MTU size over the path 103.

It is important that the initial TU size and the increase in TU size be chosen carefully in order to detect the drop in data transfer rate. For example, if the TU size increase is 100% (doubled), the receiver side may not detect enough of a bandwidth drop to be confident that the TU size exceeded the actual path MTU size. FIG. 5A illustrates an example of the problem. Suppose the path is packet rate limited with a path MTU (PMTU) is about 576 bytes and the initial TU size is 480 bytes. If the TU size increases by 480 bytes each time, the drops in transfer rate at PMTU, 2×PMTU and 3×PMTU might not be observed. The measured data transfer rate may be the same at TU size 480 as for 960 and 1440. Such behavior (represented by the dashed curve 502) might be misinterpreted as a characteristic of a bit-rate limited path. Thus, too large an increase in TU size can lead to an erroneous determination of bit-rate limited path behavior. If, instead, the TU size increases by 50% of the initial TU size, the pattern of measurements at TU sizes of 480, 720, 960, 1200 and 1440 bytes reveals the bandwidth drop at PMTU, 2×PMTU, 3×PMTU, etc., as represented by the solid curve 504, behavior which is associated with a packet rate limited path.

Figure 5B:
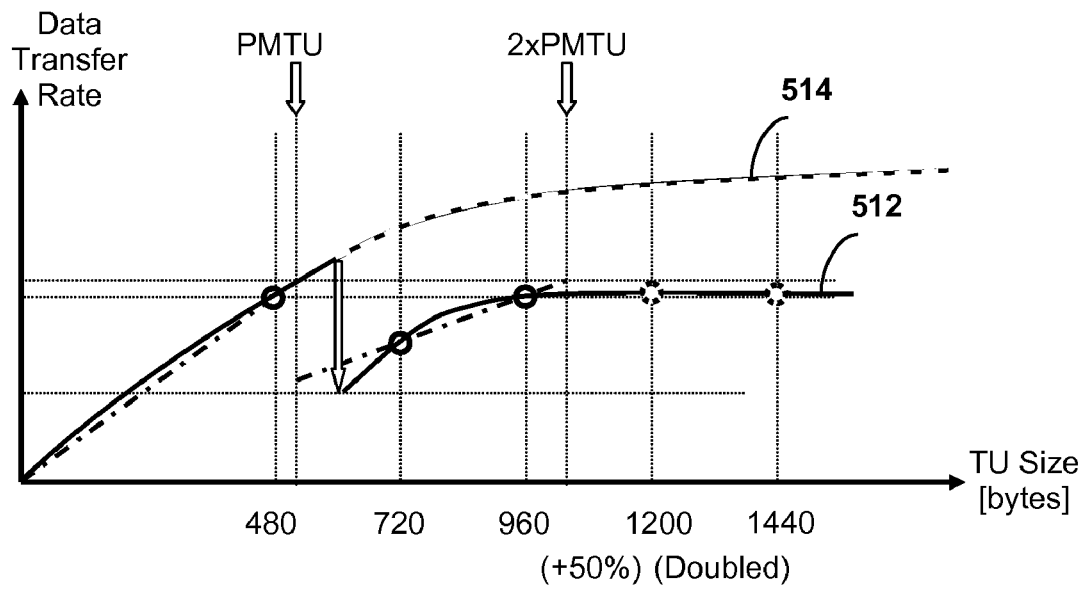
FIG. 5B is a graph illustrating an example of a false detection of a bit rate limited router.

FIG. 5B illustrates an example of a possible erroneous determination of packet rate limited behavior. It is possible that the bit-rate limit for a pps-limited router may change over time. If, for example, there is a sudden drop in the bit-rate after an initial measurement at a TU size of 480 bytes, the actual pps-limited router behavior, represented by the solid curve 512, may exhibit a sharp drop in data transfer rate followed by a recovery to a lower value. In such a case, it is possible that subsequent measurements taken at 720-byte and 960-byte TU sizes may be misinterpreted as being characteristic of packet rate limited behavior, represented by the dashed lines 514. Such an erroneous determination may be avoided, e.g., by sending out test packets at sufficiently short intervals of time that the bit rate doesn't change dramatically during the interval. In addition, it may be useful to send out packets over a sufficiently broad range of TU sizes that the true behavior may be determined.

From FIGS. 5A-5B it may be seen that "false positives" may be avoided if the initial TU size and TU size increase are not too large. For most, if not all, routers the MTU size is greater than or equal to some minimum value, e.g., 576 bytes. Thus, it is desirable to choose the initial TU size to be slightly less (e.g., about 15-20% less) than the minimum value. It is possible that the MTU size of a router may be set to less than 576. It is noted that there is no clear standardized requirement on the minimum MTU size of IPv4, however, current practice in the Internet is that the minimum MTU is known to be 576 as stated in RFC 1122 section 3.3.3 "Fragmentation". Furthermore, in RFC 1066 (IP MTU Discovery Options), for example, 576 bytes is also recommended as a default minimum MTU size. For the reasons explained above with respect to FIG. 5A, it is also desirable that the TU size increase be less than or equal to about 50% of the initial TU size. Furthermore, it is also desirable to repetitively test the path between the hosts 102, 104 with test packets of varying size to verify a previous result.

Figure 6:
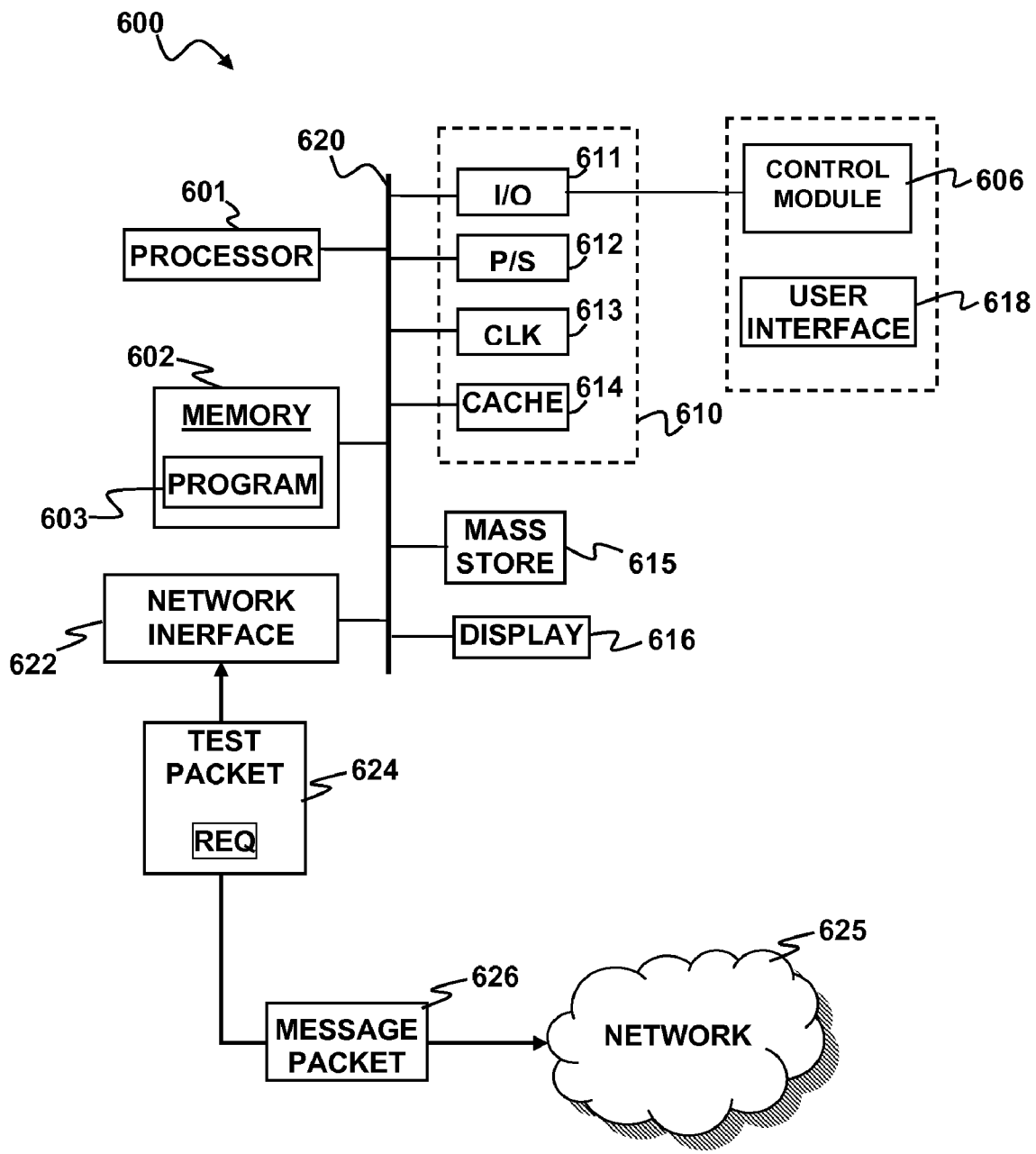
FIG. 6 is a schematic diagram of an apparatus for path MTU discovery according to an embodiment of the present invention.

As depicted in FIG. 6, a host device 600 may include a processor 601 and a memory 602. The processor 602 may be a microprocessor or microcontroller chip of a type commonly used in electronic devices, e.g., a PIC microcontroller from Microchip Technology, Inc. of Chandler, Ariz. Alternatively, the processor 602 may be a parallel processor module, such as a Cell Processor. An example of a Cell Processor architecture is described in detail, e.g., in *Cell Broadband Engine Architecture*, copyright International Business Machines Corporation, Sony Computer Entertainment Incorporated, Toshiba Corporation Aug. 8, 2005 a copy of which may be downloaded at http://cell.scei.co.jp/, the entire contents of which are incorporated herein by reference. The memory 602 may be in the form of an integrated circuit, e.g., RAM, DRAM, ROM, and the like). A computer program 603 may be stored in the memory 602 in the form of processor readable instructions that can be executed on the processor 601. The instructions of the program 603 may include the steps of the method 200 as depicted in FIG. 4 and described herein. The device 600 may optionally include a control module 606. The control module may be mechanically mounted to or physically incorporated into the device 600. Alternatively the control module 606 may be a remote unit that interacts with the rest of the device 600 via a communication link, which may be a cable or wireless link.

The device 600 may also include well-known support functions 610, such as input/output (I/O) elements 611, power supplies (P/S) 612, a clock (CLK) 613 and cache 614. The device 600 may optionally include a mass storage device 615 such as a disk drive, CD-ROM drive, tape drive, or the like to store programs and/or data. The device 600 may also optionally include a display unit 616 and user interface unit 618 to facilitate interaction between the device 600 and a user. The support functions 610, mass storage 615, display 616 and user interface 618 may be coupled to the processor and/or memory by a data bus 620. The display unit 616 may be in the form of a cathode ray tube (CRT) or flat panel screen that displays text, numerals, graphical symbols or images. The user interface 618 may include a keyboard, mouse, joystick, light pen or other device. As shown the particular example depicted in FIG. 6, the user interface 618 may be incorporated into the control module 606. The device 600 may also include a network interface 622 to enable the device to communicate with other devices over a network 625, such as the internet. These components may be implemented in hardware, software or firmware or some combination of two or more of these. The host device 600 may send test data packets 624 and send and receive message packets 626 over the network 625. Each test packet may include a request REQ for a remotely located host to reply to the host device 600 if the test the remote host receives the test packet. The request REQ may also request the remote host to provide a data transfer rate for the test packet with the reply.

Embodiments of the present invention are related to a Path MTU discovery technique that does not depend on any requirement to the underlying protocol (e.g., DF bit, etc) and can effectively determine path MTU size.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. In the claims that follow, the expressions first and second are used to distinguish between different elements and do not imply any particular order or sequence. The appended claims are not to be interpreted as including means-plus-function limitations, unless such a limitation is explicitly recited in a given claim using the phrase "means for."

What is claimed is:

1. A method for network communication between a first host and a second host connected by a network, the method comprising:
   a) sending a plurality of test packets of varying transmission unit (TU) size from the first host to the second host, wherein a "do not fragment" (DF) flag for the test packets is not set;
   b) determining whether one or more of the test packets were received by the second host;
   c) determining whether a network path between the first and second hosts is bit-rate limited or packet rate limited based on one or more patterns of receipt of the test packets by the second host;
   c') calculating an estimated path MTU size for the network path between the first and second hosts based on the one or more patterns of receipt of the test packets by the second host, wherein the path MTU size is determined differently if the network path is bit-rate limited than if the network path is packet rate limited; and
   d) sending one or more message packets of a size less than or equal to the estimated path MTU size over the network path.

2. The method of claim 1, wherein a) comprises sending one or more test packets of increasing size compared to an initial TU size from the first host to the second host.

3. The method of claim 2 wherein an increase in size of the test packets is characterized by a TU size increase that is less than or equal to about 50% of the initial TU size.

4. The method of claim 2 wherein the initial TU size is 576 bytes.

5. The method of claim 1, wherein c) further comprises determining a data transfer rate of test packets received by the second host and wherein the one or more patterns include a behavior of the data transfer rate of the test packets received by the second host as a function of the TU size.

6. The method of claim 5 wherein determining the data transfer rate comprises including in the test packets a request for the second host to send a reply containing the data transfer rate and receiving the reply at the first host.

7. The method of claim 5, wherein c') includes determining a behavior of the data transfer rate of the packets received by the second host as a function of TU size.

8. The method of claim 7, wherein c') includes determining whether a drop in data transfer rate exhibits occurs above a particular TU size.

9. The method of claim 7, wherein c') includes determining whether the data transfer rate tends to flatten out with increasing TU size.

10. The method of claim 1 wherein the plurality of test packets comprise a plurality of User Datagram Protocol (UDP) packets.

11. The method of claim 1, further comprising repetitively testing the path between the first and second host with packets of varying size to verify a previous result.

12. The method of claim 1 wherein a) comprises, sending one or more packets at an initial bandwidth and gradually increasing the bandwidth for subsequent packets until bandwidth saturation is detected.

13. The method of claim 1 wherein d) takes place by peer-to-peer connection between an application layer of a protocol stack on the first host and an application layer of a protocol stack on the second host.

14. The method of claim 1 wherein d) takes place by peer-to-peer connection between a transport layer of a protocol stack on the first host and a transport layer of a protocol stack on the second host.

15. An apparatus for discovery of a maximum transmission unit (MTU) size in a path between two nodes of a network, comprising:
   a first host having a computer with a computer readable program stored in a memory the wherein the program is configured to implement a method for discovery of a path MTU size between the two nodes, the method comprising:
   sending a plurality of test packets of varying transmission unit (TU) size from the first host to the second host;
   determining whether one or more of the test packets were received by the second host;
   determining whether a network path between the first and second hosts is bit-rate limited or packet rate limited based on one or more patterns of receipt of the test packets by the second host; and
   calculating an estimated path MTU size for a network path between the first and second hosts based on the one or more patterns of receipt of the test packets by the second host, wherein the path MTU size is determined differently if the network path is bit-rate limited than if the network path is packet rate limited.

16. The apparatus of claim 15 wherein the first host includes a protocol stack having an application layer, wherein the program is configured to be implemented at the application layer.

17. A non-transitory computer readable medium encoded with a computer readable program configured to implement a method for discovery of a maximum transmission unit (MTU) size in a path between a first host and a second host connected by a network, the computer readable program comprising: a) an instruction that when executed causes the first host to send a plurality of test packets of varying transmission unit (TU) size from the first host to the second host; b) an instruction that when executed causes the first host to determine whether one or more of the test packets were received by the second host b') an instruction, that when executed causes the first host to determine whether a network path between the first and second hosts is bit-rate limited or packet rate limited based on one or more patterns of receipt of the test packets by the second host; and c) an instruction that when executed causes the first host to calculate an estimated path MTU size for a network path between the first and second hosts based on the one or more patterns of receipt of the test packets by the second host, wherein the path MTU size is determined differently if the network path is bit-rate limited than if the network path is packet rate limited.

* * * * *